United States Patent [19]

Luch

[11] Patent Number: 5,567,296
[45] Date of Patent: Oct. 22, 1996

[54] PROCESS FOR PRODUCING VEHICULAR FUEL TANKS

[76] Inventor: Daniel Luch, 17161 Copper Hill Dr., Morgan Hill, Calif. 95037

[21] Appl. No.: 484,082

[22] Filed: Jun. 7, 1995

Related U.S. Application Data

[62] Division of Ser. No. 271,266, Jul. 6, 1994, which is a continuation of Ser. No. 5,556, Jan. 19, 1993, abandoned.

[51] Int. Cl.$^6$ .................................................. C25D 5/54
[52] U.S. Cl. ..................... 205/158; 205/176; 205/177; 205/181; 205/182
[58] Field of Search ................................. 205/158, 176, 205/177, 181, 182

[56] References Cited

U.S. PATENT DOCUMENTS

| | | |
|---|---|---|
| 4,429,020 | 1/1984 | Luch ........................................ 205/158 |
| 5,186,875 | 2/1993 | Fukuhara ................................... 264/37 |

FOREIGN PATENT DOCUMENTS

| | | |
|---|---|---|
| 23791 | 2/1986 | Japan ....................................... 205/158 |

*Primary Examiner*—John Niebling
*Assistant Examiner*—Kishor Mayekar

[57] ABSTRACT

A hollow container for storage and transport of fluid hydrocarbon vehicular fuels is composed of a laminated structure of polymeric resin body component and electrodeposited metal. An interior stratum of polymer chemically resistant to the fuel is joined to a stratum of electroplateable polymer disposed to the exterior of the interior stratum. The laminated polymeric structure is then electroplated to form a skin of metal encapsulating the interior polymeric strata. The tank combines the structural design flexibility of plastic with the metal barrier properties regarding evaporative emissions, permitting the use of high contents of oxygenated species in the fuel.

9 Claims, 3 Drawing Sheets

PRIOR ART METAL

PRIOR ART PLASTIC

PRIOR ART PLASTIC ic substrates has been employed to achieve decorative
PROCESS FOR PRODUCING VEHICULAR FUEL TANKS This is a division of application Ser. No. 08/271,266 filed Jul. 6, 1994 which is a continuation of application Ser. No. 08/005,556 filed Jan. 19, 1993, now abandoned.

BACKGROUND OF THE INVENTION

Tanks and containers for motor vehicle fuels currently are produced by one of two competing technologies. One comprises forming two or more pieces of coated steel into mating "top" and "bottom" portions and then combining the portions with classical metal joining technologies. A second comprises blow molding of a thermoplastic polymer melt. The thermoplastic melt is generally based on a polyolefin such as high density polyethylene for cost, processing and compatibility reasons. Plastic tanks, currently considered more expensive, have significant design and flexibility advantages compared with metal tanks.

There exists an ever-increasing concern with automotive generated pollutants. One aspect of the problem is reduction in simple evaporative emissions of raw fuel from the storage tank and delivery system. Simple monolayer plastic tanks suffer from fuel permeation and excessive evaporative emissions. However, to capture the design advantages of plastics, expensive barrier technologies such as fluorination, sulfonation or coextruded barrier layers are used to control evaporation. Metal tanks, while impervious to evaporation through the major surface portions, are susceptible to evaporative escape through joints and seams, especially as these features deteriorate with age.

The California Air Resource Board (CARB) has issued new standards regarding automotive emissions to take effect in 1996. The new standards regarding evaporative emissions from vehicle fuel systems are approximately ten times more stringent than the current (1993) evaporative standards. The plastic barrier technologies as classically practiced appear only marginally acceptable in meeting the new evaporative standards.

The new CARB standards also focus on a reduction in polluting combustion gases and therefore will likely require cleaner burning fuels. Cleaner burning fuels can be formulated by blending 10% to 20% of an oxygenated hydrocarbon such as methanol or ethanol into the fuel mix. However, the anticipated introduction of oxygenated fuels presents unique problems regarding evaporative escape. Methanol, and to a greater extent ethanol, increase volatility of the raw fuel, resulting in increased evaporative escape. The volatility impact of oxygenated additives makes it increasingly difficult, if not impossible, to achieve the rigid new CARB evaporative standards with plastic tanks using classical barrier technologies. Metal tanks also suffer in the presence of oxygenated fuel additives from all increase in interior corrosion attack, promoting premature deterioration. These various problems are thoroughly reviewed in Plastics Technology Magazine, May, 1992, pages 52–57.

The entire issue of oxygenated fuels is further complicated by economic and political forces. Methanol is produced from petroleum. Since methanol has less effect on volatility than ethanol, consideration of emissions alone would lead to a choice of methanol as the primary oxygenated additive. However, ethanol is an agricultural product whose use would be a huge economic benefit to farmers and preserve petroleum stocks. Those knowledgeable in the art are quick to point out that the increased evaporation resulting from ethanol containing fuels could well overcome the positive effects of decreasing harmful combustion products. Despite this concern, the political and economic benefits of ethanol use as an oxygenated additive have resulted in a U.S. Government decision to permit ethanol use in automotive fuel blends. This issue has been widely discussed in the U.S. press, for example U.S.A. Today, Oct. 2, 1992.

There is an immediate need for an improved gasoline tank technology that would be capable of allowing the use of oxygenated fuel additives without deleterious evaporative effects while maintaining the cost and design advantages associated with existing tank technologies.

In seemingly unrelated technology, electroplating on plastic substrates has been employed to achieve decorative effects on items such as knobs, cosmetic closures, faucets and automotive trim. ABS (acrylonitrile-butadiene-styrene) plastic dominates as the substrate of choice for most applications because of a blend of mechanical and process properties and ability to be uniformly etched. The overall plating process comprises many steps. First, the plastic substrate is chemically etched to microscopically roughen the surface. This is followed by depositing an initial metal layer by chemical reduction. This initial metal layer is normally copper or nickel of thickness typically one-half micrometer. The object is then electroplated with metals such as bright nickel and chromium to achieve the desired thickness and decorative effect. The process is very sensitive to fabrication processing of the plastic substrate, limiting applications to carefully molded parts and designs. In addition, the many steps employing harsh chemicals make the process intrinsically costly and environmentally difficult. Finally, the sensitivity of ABS plastic to liquid hydrocarbons has prevented certain applications.

Certain printed circuits are produced using the chemical metal reduction techniques which comprise the initial portion of the overall decorative plating of ABS plastic. In the case of printed circuits, the metal layer can be relatively thin because it is protected by enclosures and need not exhibit decorative effects.

The conventional technology for electroplating on plastic (etching, chemical reduction, electroplating) has been extensively documented and discussed in the public and commercial literature. See, for example, Saubestre, Transactions of the Institute of Metal Finishing, 1969, Vol. 47., or Arcilesi et. al., Products Finishing, March, 1984.

Many attempts have been made to simplify the process of electroplating on plastic substrates. Some involve special chemical techniques to produce an electrically conductive film on the surface. Typical examples of this approach are taught by U.S. Pat. No. 3,523,875 to Minklei, U.S. Pat. No. 3,682,786 to Brown et al., and U.S. Pat. No. 3,619,382 to Lupinski. The electrically conductive film produced was then electroplated.

Another approach to simplify electroplating of plastic substrates is incorporation of electrically conductive fillers into the resin to produce an electrically conductive plastic. The electrically conductive resin is then electroplated. Examples of this approach are the teachings of Adelman in U.S. Pat. No. 4,038,042 and Luch in U.S. Pat. No. 3,865,699. The Adelman approach included pre-etching to achieve adhesion of the electrodeposit. Luch taught incorporation of small amounts of sulfur into the polymer compound to produce a chemical bond between the plastic substrate and electrodeposit. None of the above alternate approaches to conventional electroplating of plastics has achieved widespread commercial application.

Numerous other attempts have been made to impart certain metallic properties to plastics, especially electrical conductivity. The impetus for many of these efforts is the increasing emphasis on shielding of electromagnetic radiation. These other attempts include metal-filled conductive paints, metal sprays, foils, metallized sheets, silver reduction, vacuum metallizing and cathode sputtering.

OBJECTS OF THE INVENTION

It is an object of the present invention to provide an improved tank for storage and transport of hydrocarbon based vehicular fuels. A further object is to provide a design which will reduce evaporative emissions from fuel tanks and permit use of methanol or ethanol as oxygenated fuel additives. It is a further object to provide a process by which the improved fuel tank may be produced.

Other objects and advantages will become apparent in light of the following description taken in conjunction with the drawings and embodiments.

SUMMARY OF THE INVENTION

The present invention contemplates a composite fuel tank comprising layers of polymer and metal joined together in a secure laminated structure. The polymer body component of the tank comprises multiple layers. A first interior polymer layer must have excellent chemical resistance to fuels and ability to be blow molded. Typically a material such as high density polyethylene or other olefin polymer would be chosen. An electroplateable resin stratum, in the preferred embodiment a DER, is positioned to the exterior and joined to the interior layer. Directly electroplateable resins, (DER), are characterized by the following features:

(a) having a polymer matrix;

(b) presence of carbon black in amounts sufficient for the overall composition to have an electrical volume resistivity of less than about 1000 ohm-cm., e.g., 100 ohm-cm., 10 ohm-cm., 1 ohm-cm.;

(c) presence of sulfur (including any sulfur provided by sulfur donors) in amounts greater than about 0.1% by weight of the overall polymer-carbon-sulfur composition; and (d) presence of the polymer, carbon and sulfur in said directly electroplateable composition of matter in cooperative amounts required to achieve direct, uniform, rapid and adherent coverage of said composition of matter with an electro-deposited Group VIII - based metal.

The minimum workable level of carbon black required to achieve electrical resistivities less than about 1000 ohm-cm. appears to be about 8 weight percent based on the weight of polymer plus carbon black.

Polymers such as polyvinyls, polyolefins, polystyrenes, elastomers, polyamides and polyesters are suitable for a DER matrix, the choice generally being dictated by the physical properties required.

Optionally, additional polymer based strata, such as barrier, regrind, or adhesive layers as required to bond the structure together can be placed between the first interior layer and the DER layer. In addition, the interior surface may be subjected to barrier treatments such as fluorination or sulfonation if desired.

Typically the multi-layer plastic body component of the tank is produced by conventional blow molding. A multi-layered melt parison is first coextruded, then clamped in a mold where the parison is blown with pressurized gas to the final desired shape. The plastic tank is then trimmed to remove excess material. It is important that the various polymeric layers have melt characteristics suitable for this operation. Thus the capability of directly electroplateable resins to be melt compounded and "tailored" to the fabrication process is and important characteristic.

The exterior metal portion of the fuel tank is electroplated, generally as a multi-stratum structure. The tank is first electroplated with a Group VIII - based metal or alloys thereof. Herein "Group VIII - based" refers to an electrodeposited metal (including alloys) containing, by weight, 50% to 100% metal from Group VIII of the Periodic Table of Elements. "Alloy" refers to a substance having metallic properties and being composed of two or more chemical elements of which at least one is an elemental metal. The purpose of the initial Group VIII - based electrodeposit is to achieve a durable, adherent metal stratum joined to the interior polymer body component.

After achieving metal coverage with the Group VIII - based electrodeposit, further electrodeposition is used to increase thickness, abrasion and corrosion resistance, or to achieve other special characteristics. For example, electrodeposition of zinc or copper can be employed to rapidly increase metal thickness with an inexpensive, ductile metal.

Finally, an exterior layer may be employed to achieve superior protection against the environment. This exterior layer may take the form of a chemically generated metal chromate or simply a polymer based corrosion protecting paint coating.

The envisioned tank structure retains the advantages of both polymeric and metal tanks. The design, fabrication flexibility and corrosion resistance to oxygenated fuels of plastic is retained by the polymer based interior body component. The ultimate resistance of metal to evaporative emissions is retained, especially since the envisioned tank comprises a seamless metal exterior.

BRIEF DESCRIPTION OF THE DRAWINGS

The various features and details of the fuel tank of the present invention and the method for making the tank are hereinafter more fully set forth with reference to the accompanying drawings, wherein.

DESCRIPTION OF THE PREFERRED EMBODIMENTS

Figure 1:
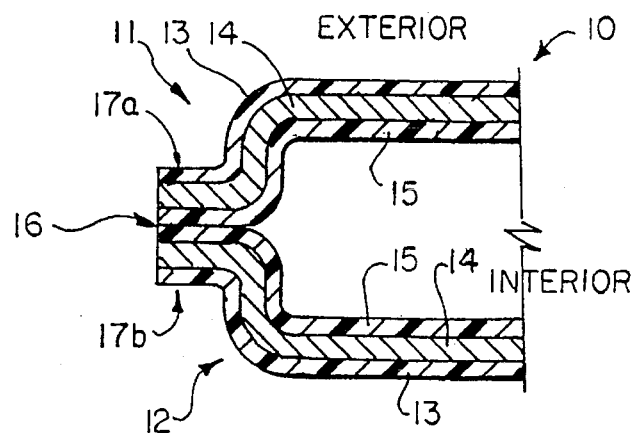
FIG. 1 is a sectioned side elevational view of a metal tank produced by prior art technology.
Figure 2:
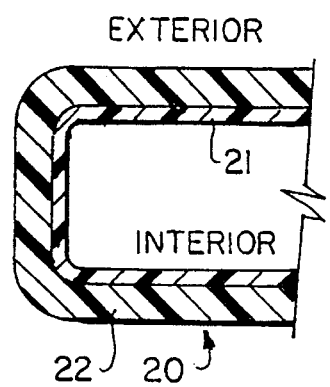
FIG. 2 is a sectioned side elevational view of a version of a prior art plastic tank.
Figure 3:
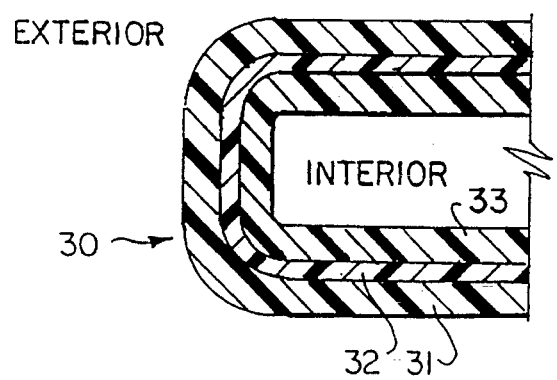
FIG. 3 is a sectioned side elevational view of another prior art plastic tank of structure different than that of FIG. 2.

FIGS. 1, 2, and 3 depict cross-sectional structures of prior art fuel tanks. Numeral 10, FIG. 1, points to a two-part metal tank having a "top half" 11 and a "bottom half" 12. General practice joins these two halves together to form tank 10 with seam weld 16 at flanges 17a and 17b. Metal tank 10 generally comprises steel stratum 14 laminated with corrosion resistant strata 13 and 15. Stratum 13 can be a zinc-rich epoxy layer to resist exterior corrosion while stratum 15 can comprise an aluminum rich epoxy layer to resist internal corrosion, especially in the presence of oxygenated fuels.

FIGS. 2 and 3 depict prior art plastic tanks. Strata 22, 31 and 33 represent polymer based materials chemically resistant to vehicular fuels. Typically polyolefins, especially high density polyethylene, are chosen for these strata because of chemical, cost and processability considerations. Stratum 21 depicts a fluorinated polymer layer, produced by introducing fluorine gas into the tank after blow molding. The fluorinated polymer stratum functions as a barrier to evaporative fuel emissions.

Numeral 32 of FIG. 3 depicts a stratum of a barrier polymer which is coextruded and blow molded simultaneously with structural strata 31 and 33. Strata 31 and 33 may be composed of a polyolefin such as high density polyethylene. Stratum 32 may be composed of a suitable barrier to fuel permeation such as ethylene vinyl alcohol (EVOH) or amorphous nylon. Appropriate adhesive layers, not shown, may be included to insure durable joining of layers 31, 32 and 33. While barrier stratum 32 is relatively thin, its presence as a "foreign" material can render the structure brittle and subject to delamination. The prior art structures depicted in FIGS. 1, 2 and 3 do not represent the present invention.

The present invention, depicted in the embodiments of FIGS. 4 through 8, comprises a laminate structure having polymer based interior layers and electrodeposit based metal outer layers. In the following description of the embodiments of the invention, similar features appear in multiple embodiments and are therefore designated by the same numeral followed by a letter characteristic of the particular embodiment.

Figure 4:
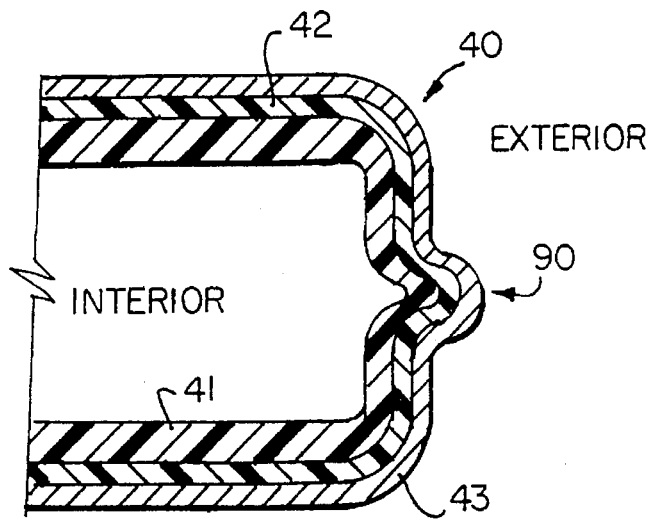
FIG. 4 is a sectioned side elevational view of an embodiment of the present invention.

The present invention is depicted in its simplest form in FIG. 4, wherein interior polymer stratum 41 is joined to exterior electrodeposited metal stratum 43 through DER stratum 42. Tank 40 is produced by first forming the polymer laminate 41/42 into a hollow tank. Normally this is accomplished by coextruding the strata 41 and 42 to form a dual layered polymer melt parison, clamping the parison in a mold and then injecting pressurized air to expand the laminated melt against the walls of the mold. Alternatively, the polymer laminate 41/42 can be produced by sequential rotomolding of DER and polyolefin based powders. A third alternative would be to coextrude sheets of the 41/42 laminate, form "top" and "bottom" halves of tank 40 with standard sheet forming techniques, and finally join the two "halves" together.

Strata 41 and 42 can be both based on resins, such as polyolefins, which are chemically resistant to vehicular fuels and which can be formulated for optimum performance in the blow molding process. The ability of DER compositions to be formulated for both excellent processing and chemical resistance is an important characteristic compared to the resins, such as ABS, normally employed for conventional electroplating of plastics.

The molded polymeric tank is then electroplated. Since the tank has a continuous exterior stratum of DER after molding, it can be subsequently electroplated directly with a Group VIII metal-based electrodeposit to achieve complete metal encapsulation of the tank. Procedures to electroplate DER substrates have been previously published in the art. See, for example, Luch, Society of Automotive Engineers, Paper 790218, 1979. Typically, the applied voltage is "ramped" to promote initial metal coverage. "Ramping" of the voltage is done by initially applying a low voltage, such as 1 volt, for a short period of time such as 1 minute. This period of low voltage allows the electrodeposit to jump from the highly conductive metal contact to the semi-conductive DER surface. The voltage is then gradually increased over a period of about 4 minutes to the final voltage, typically 7 or 8 volts. Generally as the voltage ramp nears completion, electrodeposit coverage of the entire surface becomes complete. Electroplating can then be continued at optimal current densities to rapidly build to the desired thickness.

Design features are important in achieving effective, rapid and uniform electrodeposit coverage. Sharp corners or deep depressions should be avoided. The design should include features to facilitate attachment of the cathodic electrical contacts, such as ear 90 shown in FIG. 4. Any outward extending flange or ear would serve as an effective attachment feature.

Figure 5:
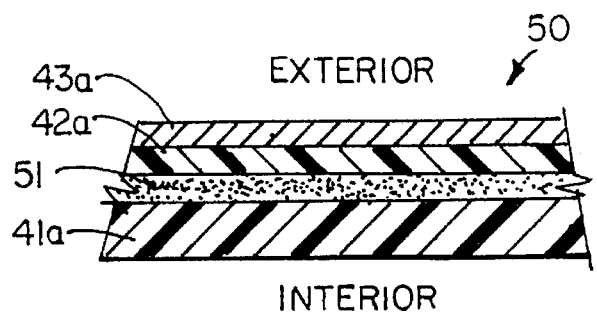
FIGS. 5 through 8 are sectioned side elevational views of additional modifications of the present invention.

In the embodiment of FIG. 4, the adhesion between polymer strata 41 and 42 is adjusted by selection of the resin base for the separate layers. For example, choosing similar or identical polymers such as high density polyethylene as a basis for both strata would result in excellent adhesion of these two polymer based strata. However, in some cases it may be advantageous to choose different polymer species or be able to otherwise adjust the adhesion between the interior polymer stratum and the DER stratum. In FIG. 5, intermediate stratum 51 joins interior stratum 41a and DER stratum 42a. In the case where strata 41a and 42a are based on different polymer species, for example polyethylene and polypropylene, stratum 51 may serve as an adhesive layer joining the two. Alternatively, stratum 51 can be used to adjust the adhesion between strata 41a and 42a even when these strata are based on similar or identical polymers. This adhesion adjustment capability may be particularly important to prevent impact notch sensitivity increases resulting from the rigid electrodeposit.

Figure 6:
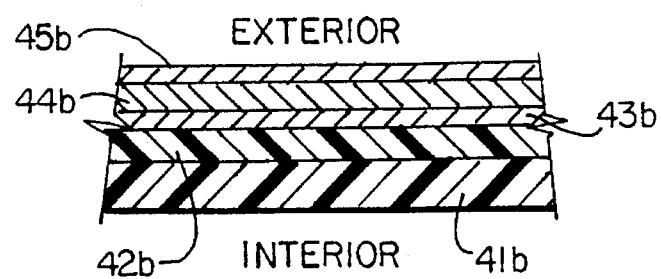

FIG. 6 illustrates a further modification of the invention. Here 41b, 42b, and 43b refer to interior polymer, DER and Group VIII metal-based electrodeposit respectively. However, to achieve superior corrosion, abrasion and evaporative resistance, an additional stratum 44b of an inexpensive electrodeposited metal such as zinc or copper is added. For additional protection against exterior corrosion, stratum 44b may be immersed in a chemical chromating solution to give exterior chromate layer 45b. Alternatively, protective layer 45b may be a polymer based paint coating.

Typical thicknesses for the various strata of FIG. 6 are given in Table I.

TABLE I

| TYPICAL THICKNESSES | |
| --- | --- |
| Stratum | Thickness |
| Interior Polymer (41) | 2.5 millimeters |
| DER (42) | 0.1–0.2 millimeters |
| Group VIII Deposit (43) | 5 micrometers |
| Zinc or Copper Deposit (44) | .05 millimeter |
| Protective Chromate (45) | 0.2 micrometer |

Figure 7:
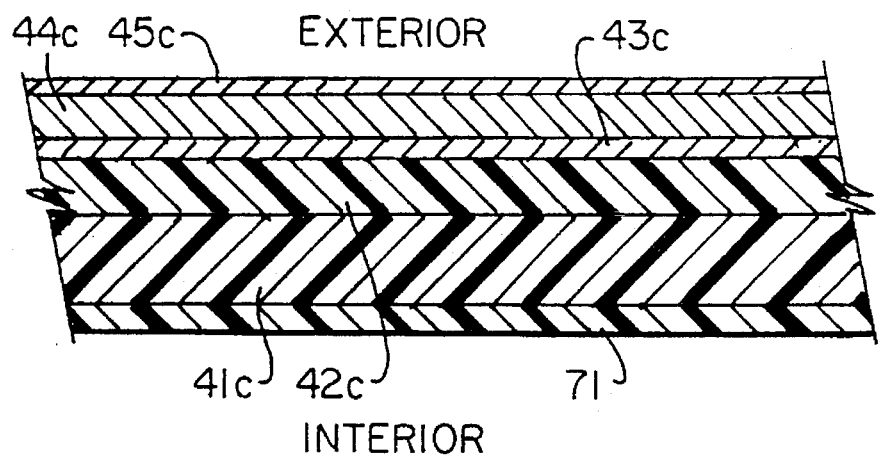

Another modification of the present invention is illustrated in FIG. 7, wherein 41c, 42c, 43c, 44c, and 45c represent respectively interior polymer, DER, Group VIII metal-based electrodeposit, zinc or copper electrodeposit and exterior protective strata similar to the structure of FIG. 6. However, the embodiment of FIG. 7 further comprises an interior barrier stratum 71 achieved through fluorination or sulfonation. Stratum 71 is produced by procedures known in the art.

Figure 8:
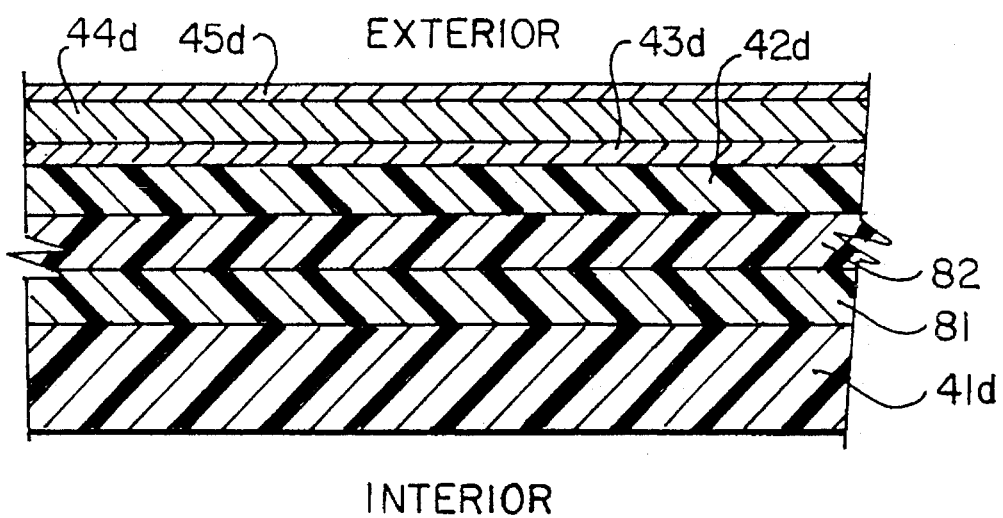

FIG. 8 presents another modification of the current invention, wherein 41d, 42d, 43d, 44d, and 45d respectively represent interior polymer, DER, Group VIII metal-based electrodeposit, zinc or copper electrodeposit and protective strata. In FIG. 8, a stratum 81 of a barrier polymer, such as ethylene vinyl alcohol (EVOH) is placed between interior polymer stratum 41d and polymer based stratum 82. Stratum 82 may be composed of a polymer base different than that of stratum 41d. For example, polymeric regrind may be chosen for stratum 82. Adhesive layers, not shown, may join barrier stratum 81 to strata 41d and 82.

It is noted that all of the embodiments of the invention illustrated in FIGS. 4 through 8 envision a seamless composite structure wherein the exterior metal layer is also seamless and free of troublesome welds. To achieve this with an extrusion blown tank, a small amount of DER based paint or hot melt may be applied at trim lines prior to electroplating.

In addition to melt parison coextrusion and blow molding, other methods which could produce the polymeric laminated structures of FIGS. 4 through 8 include:

1. Rotomolding using polymeric powders melted and sintered against the walls of a heated mold. The laminated structure could be made by sequential processing of powders to form the various laminates or by paint application of the directly electroplateable resin stratum over a rotomolded base.

2. Twin sheet thermoforming wherein the polymeric laminate is extruded into sheets and then thermoformed into two tank halves which are welded together.

In these alternate cases for producing the polymeric laminate body component, electroplating would be accomplished in the same manner as for a blow molded tank.

In order to eliminate ambiguity in terminology of the present specification and claims, the following definitions are supplied.

"Metal-based alloy" refers to a substance having metallic properties and being composed of two or more elements of which at least one is an elemental metal.

"Polymer-based" refers to a substance composed, by volume, of 50 percent or more hydrocarbon polymer.

What is claimed is:

1. A process for the production of a vehicular fuel tank having reduced evaporative emissions of hydrocarbon fuel comprising the following steps:
   co-extruding multiple polymeric compositions to form a multilayered polymeric melt parison, said multilayered polymeric melt parison having a directly electroplateable resin at an exterior surface,
   clamping said parison in a mold having an interior mold surface,
   injecting a pressurized gas to force and expand said polymeric melt parison against said interior mold surface to create a molded polymeric structure,
   removing said molded polymeric structure from said mold,
   immersing said molded polymeric structure in an electroplating bath containing Group VIII metal ions and,
   electrodepositing a first stratum of Group VIII-based metal or Group VIII-based metal alloy adherent onto said directly electroplateable resin, wherein a vehicular fuel tank having reduced evaporative emission of hydrocarbon fuel is produced.

2. The process of claim 1 wherein said reduced evaporative emissions are sufficient to allow said tank to comply with the 1996 California Air Resource Standards.

3. The process of claim 2 wherein said hydrocarbon fuel comprises oxygenated species.

4. The process of claim 1, further comprising the step of electrodepositing a second stratum of metal adherently joined to said first stratum.

5. The process of claim 4 wherein the metal of said second stratum comprises copper or zinc.

6. The process of claim 1 further comprising the step of electrodepositing a second stratum of copper or zinc metal subsequent to the electrodeposition of the first stratum.

7. The process of claim 6 further comprising the step of immersing said second stratum in a chemical chromating bath.

8. The process of claim 1 wherein said multilayered polymeric melt parison comprises a barrier polymeric layer.

9. The process of claim 1, further comprising the step of depositing a polymeric based paint coating to provide a protective exterior layer.

\* \* \* \* \*